United States Patent [19]

Evans

[11] Patent Number: 4,546,486
[45] Date of Patent: Oct. 8, 1985

[54] CLOCK RECOVERY ARRANGEMENT

[75] Inventor: Michael W. Evans, Lynchburg, Va.

[73] Assignee: General Electric Company, Lynchburg, Va.

[21] Appl. No.: 527,471

[22] Filed: Aug. 29, 1983

[51] Int. Cl.⁴ ............................................. H03D 3/24
[52] U.S. Cl. ................................... 375/119; 328/133
[58] Field of Search ........................ 375/87, 119, 120; 360/51; 307/527; 328/133, 27

[56] References Cited

U.S. PATENT DOCUMENTS

| | | | |
|---|---|---|---|
| 3,671,776 | 6/1972 | Houston | 375/120 |
| 3,988,696 | 10/1976 | Sharpe | 328/133 |
| 4,112,383 | 9/1978 | Burgert | 375/87 |
| 4,166,979 | 9/1979 | Waggener | 328/133 |
| 4,346,353 | 8/1982 | Scholz | 375/110 |
| 4,456,890 | 6/1984 | Carickhoff | 375/120 |

FOREIGN PATENT DOCUMENTS

| | | |
|---|---|---|
| 0026436 | 9/1980 | European Pat. Off. . |
| 1251878 | 11/1971 | United Kingdom . |
| 1265402 | 3/1972 | United Kingdom . |
| 2029675 | 7/1978 | United Kingdom . |
| 2048016 | 12/1980 | United Kingdom . |
| 2099262 | 12/1982 | United Kingdom . |
| 2110894 | 6/1983 | United Kingdom . |

Primary Examiner—Douglas W. Olms
Assistant Examiner—Frank M. Scutch, III
Attorney, Agent, or Firm—Cushman, Darby and Cushman

[57] ABSTRACT

A clock recovery arrangement particularly suitable for recovering a clock signal from Manchester-encoded data. The system includes a locally generated clock at twice the data rate. This locally generated clock is phase locked to the incoming data transitions. Then, the locked locally generated clock is divided by two to produce a clock signal corresponding to the data rate. A clock flipper circuit operating according to a predetermined algorithm determines whether to change the polarity of the clock signal to provide a correct polarity recovered clock.

21 Claims, 6 Drawing Figures

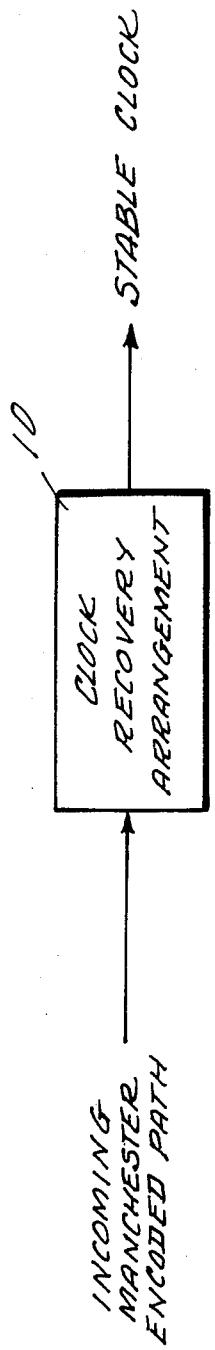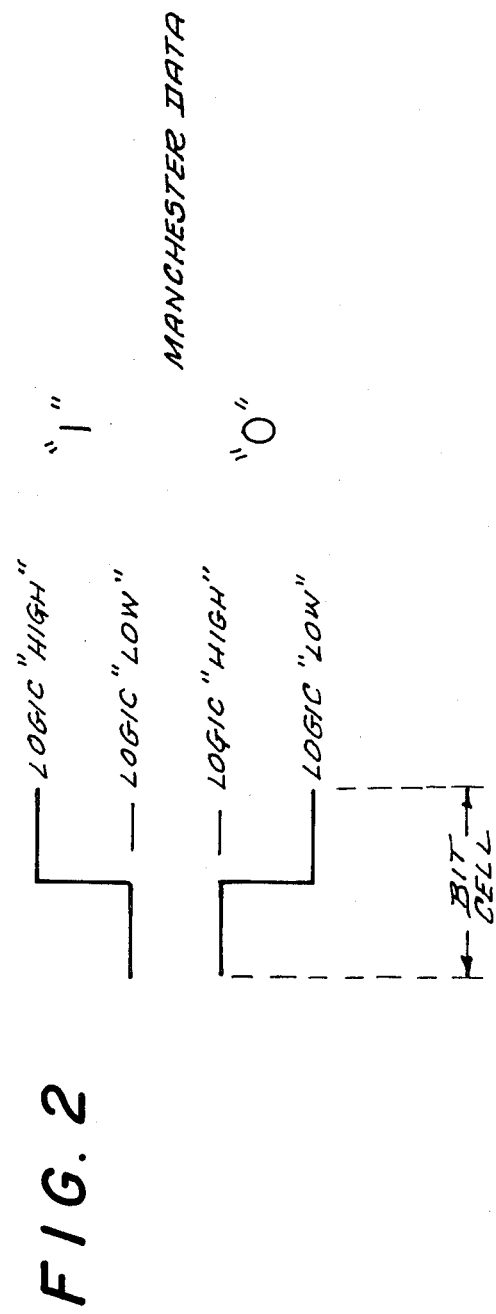

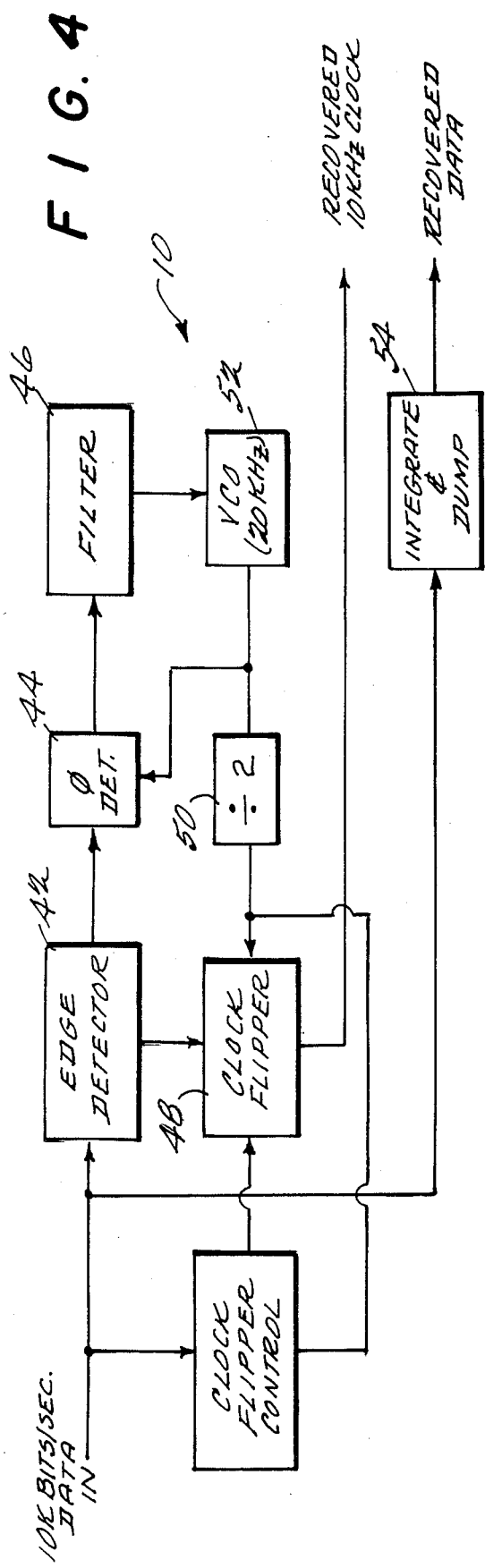
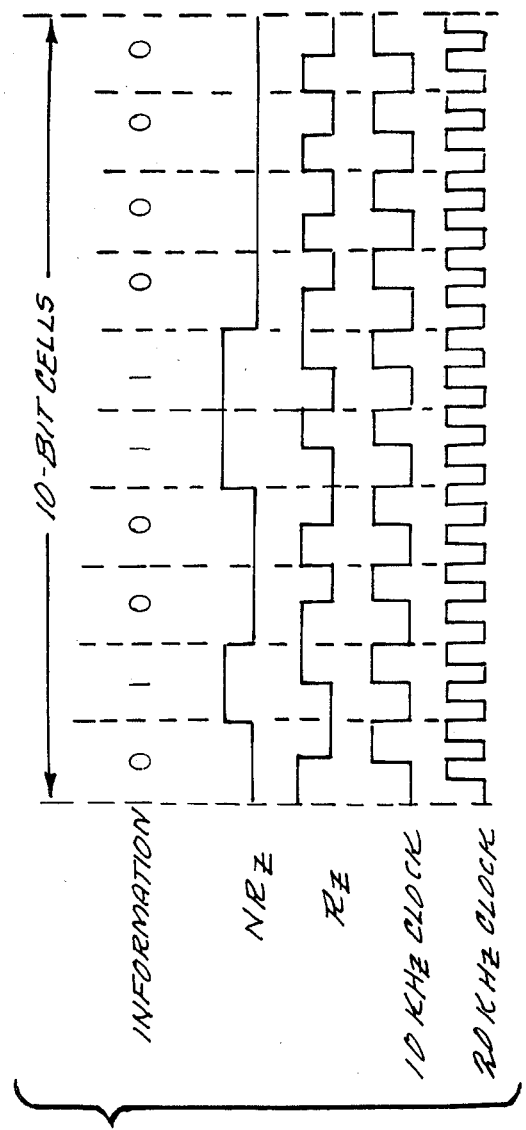

CLOCK RECOVERY ARRANGEMENT

BACKGROUND OF THE INVENTION

This invention relates to clock recovery systems for generating a clock signal synchronous with a received data stream.

It is now commonplace to transmit digital data over a radio frequency channel. In order to interpret the received data, it is necessary to make a decision as to whether each particular data "cell" is a "1" or a "0". Thus, it is necessary to identify when bit cells occur. To do this, it is necessary to recover or reconstruct the clock signal from which the data was originally generated. A variety of arrangements for clock recovery are known.

Most digital clock recovery systems use arrangements such as discussed in *Data Transmission* by W. R. Bennett and J. R. Davey (see pages 260-262). In the common system discussed in that publication, the transitions of the data are used to define edges. These edges are defined as either being "early" or "late" with respect to a local clock at the receiver. Corrections are made accordingly to line up the edges of the data transitions with the local clock. When correspondence is achieved, the local clock is synchronized with the data. The data rate is known and the local clock generates the frequency of the data.

Another known system, somewhat more sophisticated than the one described in the Data Transmission publication is described in the 1981 supplement to the TTL Data Book Second Edition published by Texas Instruments Inc. see pages 38-43. In the TI system, when a data transition or edge is received and recognized, there is maintained an indication of the amount of error. A long up/down counter keeps a running tally of the amount of error. The counter counts up for early edges and down for late edges (or vice versa). The overflow point of the counter is adjustable. When the counter overflows a correction is made. The direction of the overflow determines the direction of the correction.

The above discussed approaches to clock recovery work adequately with many digital data codes. However, these traditional approaches to clock recovery are not suitable for use with Manchester encoded data. Manchester encoded data is a return to zero (RZ) coding scheme rather than a nonreturn to zero (NRZ) code which is suitably decoded with traditional clock recovery arrangements as discussed above. In NRZ code systems, transitions i.e. from "0" to "1" or from "1" to "0" occur at the edges of a bit cell. However, with Manchester coded RZ data, transitions occur in the middle of bit cells. The definition of Manchester coded data is shown in FIG. 2. A logic "1" is characterized by a transition from "0" to "1" in the middle of the data cell. Similarly, a logic "0" is defined by a transition from "1" to "0" in the middle of a data cell. Thus, in Manchester encoded data, transitions can occur both at the edges and in the middle of a data bit cell. This property causes a variety of problems to occur at a receiver that uses edges in the receive stream to lock its local clock. In effect, a traditional clock recovery arrangement would be fooled into thinking that the transition occurring in the middle of a bit cell was actually defining a cell edge. Thus, a more suitable clock recovery arrangement for use with Manchester data is required.

SUMMARY OF THE INVENTION

Therefore the present invention provides a clock recovery arrangement suitable for recovering a clock from Manchester encoded data. There is also provided a combination data recovery and clock recovery arrangement for use with Manchester encoded data that provides a recovered clock and restored or interpreted received data. A general block diagram of the clock recovery arrangement is shown in FIG. 4. The assumption for this example is that the data was originally generated at 10 K bits/second and that is necessary to therefore recover a 10 KHz clock. Of course, these numbers are merely exemplary, the system can be adapted to other data rates and clock recovery frequencies. In a RZ data stream, valid transitions i.e. from 0 to 1 and 1 to 0 can occur at intervals of 50 MSEL. In this example, that corresponds to 20 KHz. Therefore, there is provided a digital phase locked loop operating at 20 KHz which is twice the frequency of the clock to be recovered. However, to accurately recover the data, it is necessary to produce a 10 KHz clock. Therefore, there is provided a divide by two circuit at the output of the local voltage control oscillator of the phase locked loop. Locking the loop at 20 KHz which is twice the data rate can result in a clock that is 180° out of phase with the original clock from which the data was transmitted. Therefore, there is provided a clock flipper at the output of the divide by two circuit to invert the 10 KHz clock derived from the divide by two circuit. The clock flipper circuit determines whether to "flip" or invert the 10 KHz clock based on a particular predetermined algorithm. This algorithm recognizes that edges on the incoming data are more likely in certain parts of the bits than in others. The clock flipper includes a counter which can be incremented or decremented upon transitions. For edges received during a middle portion of a bit, the counter is decremented. For edges received during the outer two corners of a bit, the counter is incremented. The counter is not decremented past zero. If an overflow occurs while incrementing, the clock is flipped.

This system not only works for Manchester encoded RZ data but also for NRZ data with a slight modification of the clock flipper algorithm. For NRZ data, the algorithm is reversed. The edges are more likely to occur at the edges of a bit cell. Therefore the counter is incremented for edges received in the middle of a bit cell.

The clock recovery arrangement according to the present invention includes an edge detector for detecting transitions in a receive data stream and providing an edge signal indicative thereof. A local (unsynchronized) clock is provided operating at double the data input rate. Thus, if the input data is at 10 K bits/second, the local clock operates at 20 KHz. The local clock is locked to the edge signal produced by the edge detector by a phase locked loop including a phase detector, a filter, and a 20 KHz VCO. The output from the VCO is divided by two to produce a 10 KHz clock that is locked to the edges. This clock is flipped as necessary according to the predetermined algorithm to produce a recovered clock that is synchronized with the incoming data stream. To provide recovery of the data also, an output from the VCO is coupled to an integrate and dump circuit which processes the incoming data to produce recovered data.

In other words, the present invention provides a clock recovery arrangement for recovering a clock synchronized to a received data stream having a first characteristic data bit frequency. The arrangement includes means for detecting edge transitions of the incoming data stream and producing an edge signal indicative thereof; means for generating a local second frequency clock signal which is twice that of the first frequency, the second frequency clock signal not being phase synchronized with the received data stream; means for phase locking the second frequency clock signal to edge transitions of the data stream to produce a phase locked second frequency clock; means for dividing the phase locked second frequency clock to produce a clock signal at the first frequency that is phase locked to the edge transitions of the data and therefore phase locked to the received data stream; and means for changing the polarity of the phase locked first frequency clock according to a predetermined function of the edge transitions, thereby producing a recovered clock synchronized to the received data stream.

To provide data recovery, there is provided in addition to the above combination of elements, a digital integrate and dump circuit coupled to the phase locking means for receiving and processing the incoming data to provide restored or recovered data.

BRIEF DESCRIPTION OF THE DRAWINGS

An exemplary embodiment of the present invention will be described in further detail with reference to the drawings forming a part of this application. The exemplary embodiment is the presently contemplated preferred embodiment and best mode for practicing the present invention contemplated by the inventor at the time of the filing of this application. Throughout the drawings, like reference numerals refer to like or corresponding parts throughout the drawings. In the drawings, FIG. 1 is a very general functional block diagram explaining the context of the present invention;

FIG. 2 is a graphical diagram explaining the definition of Manchester encoded data;

FIG. 3 is a graphical diagram showing a particular example of a data stream with comparative NRZ and Manchester coded data along with 10 and 20 KHz clocks to provide an appreciation of the relationship of an incoming data stream and locally generated clock signals;

FIG. 4 is a block diagram of the present invention;

DETAILED DESCRIPTION OF THE PREFERRED EMBODIMENT

Figure 5:
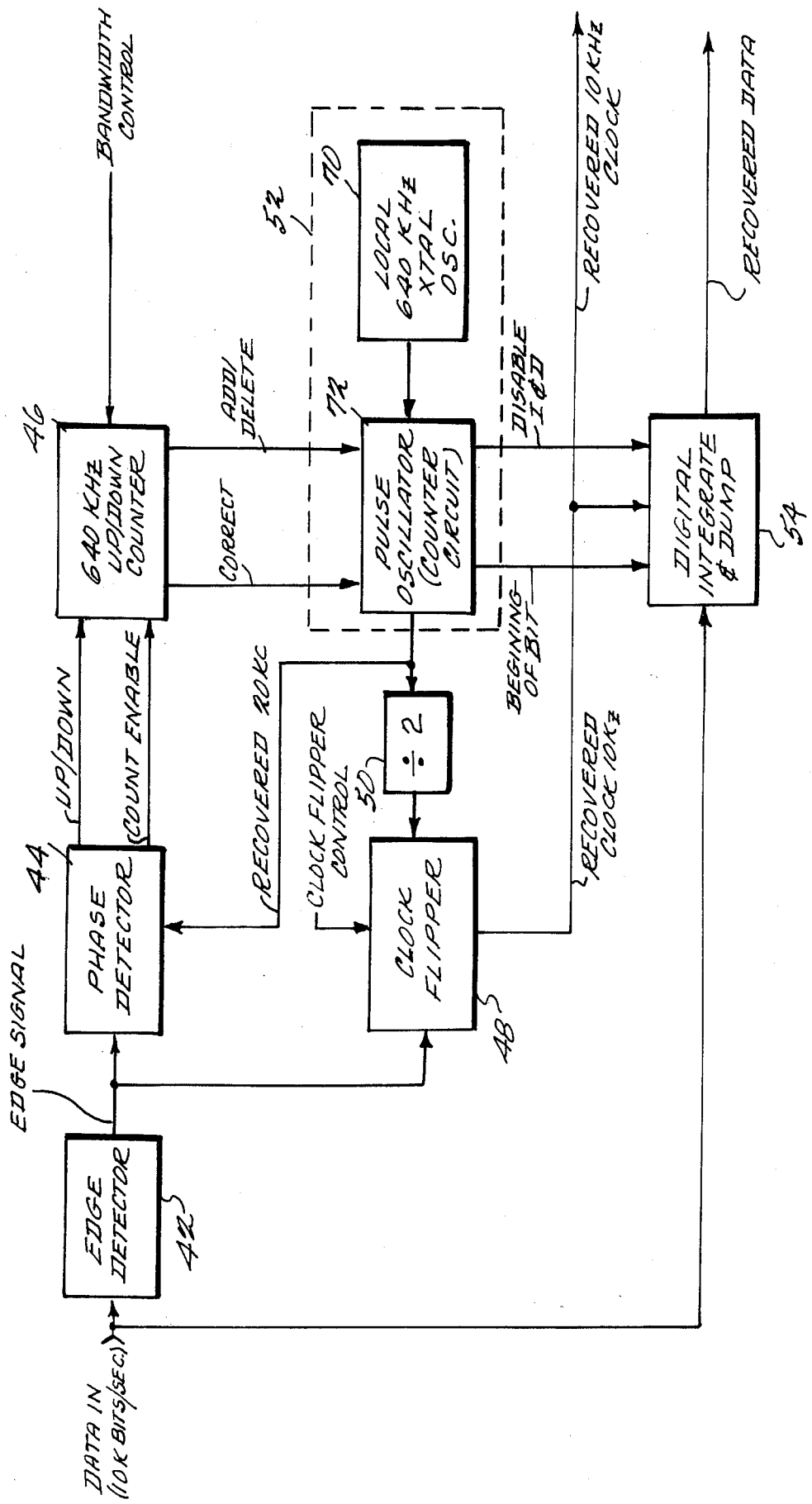
FIG. 5 is a more detailed block diagram of the present invention.

Referring now to FIG. 1 there is shown a general block diagram explaining the context of the present invention. The present invention provides a clock recovery arrangement 10 to be implemented at a receiver. The objective is to produce a stable clock synchronized with incoming Manchester encoded data.

The definition of Manchester encoded data is shown in FIG. 2. A logic "1" is defined by a transition from "low" to "high" in the middle of a bit cell. A logic "0" is defined by a transition from "high" to logic "low" in the middle of a bit cell. Thus, transitions from low to high or high to low i.e. 0 to 1 or 1 to 0 logic levels can occur either at the middle or ends of a bit cell.

Referring now to FIG. 3 there is shown an example of a data stream including 10 bit cells of serial information along with coded data in both the traditional NRZ format and the Manchester encoded RZ format. As can be seen in this drawing, with NRZ encoded data, transitions occur only at bit cell demarcation lines. However, with RZ encoded data, transitions occur in the middle of bit cells as well as at the cell demarcation lines. For reference, there is also drawn 10 and 20 KHz clocks. It is assumed that the bit cells are defined by a 10 KHz clock at a transmitter. It is appropriate when recovering a clock from NRZ data to use a locally generated clock of the same frequency as that of the incoming information such as a 10 KHz clock. This 10 KHz clock is phase locked to the edges or transitions of the NRZ data. This works quite well with NRZ data. However, as discussed in the Background section of this patent, it does not work with Manchester encoded RZ data because transitions occur in the middle of a bit cell. The phase locked loop would become "confused" by locking first on bit cell demarcation lines and then locking onto the transitions in the middle of a cell. Either phase lock would not occur at all or it may lock to the wrong point or it may jump back and forth between two lock positions depending upon the particular bits of the data stream.

The 20 KHz clock, shown in the lower portion of FIG. 3 represents the locally generated clock frequency in the clock recovery arrangement according to the present invention. As shown in the drawing, on the 20 KHz clock, transitions occur in the middle of a bit cell as well as at the ends thereof.

Referring now to FIG. 4 there is shown a general block diagram of the clock recovery and data recovery arrangement according to the present invention. Incoming data is assumed to be at a rate of 10 K bits/second based upon a 10 KHz clock at a transmitter (unshown). Incoming data is coupled to an edge detector 42 which provides an edge signal at an output thereof indicative of the transitions of the incoming data stream. These transitions may be in the middle of a bit cell or at an end of a bit cell. A local signal is generated by a 20 KHz VCO 52 which is phase locked to the edge signal from edge detector 42 by a phase locked loop including VCO 52, a phase detector 54 and a filter 46. This produces at the output of VCO 52 a 20 KHz signal that is phase locked to the transitions of the incoming data stream. The VCO output is divided by two by a divider 50 which provides a phase locked 10 KHz signal which may not be of the correct polarity with respect to the clock signal used to generate the data at the transmitter (unshown). A clock flipper 48 is provided to control the polarity of the 10 KHz signal from divider 50. The clock flipper will either invert or not invert the signal from divider 50 based on a predetermined algorithm. This predetermined algorithm is executed by a clock flipper control 56. For Manchester encoded data, more edges will occur during the middle of bit cells than at the edges. The clock flipper control includes a counter for determining how often transitions occur in the central portion of a bit cell with respect to the outer portions thereof. Specifically, for Manchester encoded data the algorithm is as follows. For edges received during the middle half of a bit the counter is decremented. For edges received during the outer two quarters of a bit, the counter is incremented. The counter is not decremented past zero. If an overflow occurs while incrementing the clock flipper 48 is instructed to flip the polarity of a clock from divider 50.

For NRZ data, the algorithm is similar but reversed. The edges are more likely to occur at the demarcation between bit cells so the counter is incremented for edges received in the middle of a bit cell rather than at its demarcation lines. Once the local clock is established, the VCO 52 provides a control signal to an integrate and dump circuit 54 for processing incoming data to provide recovered data.

Referring now to FIG. 5 there is shown a more detailed block diagram of the clock recovery and data recovery arrangement according to the present invention. It is to be understood that this block diagram arrangement is but one convenient implementation of the principles of the present invention. It is presently considered the preferred such implementation but it is recognized that other implementations are possible. This example continues to assume a 10 K bit/second data input in Manchester encoded form. Reference numerals used in this Figure denote corresponding parts to those shown in FIG. 4. The objective is to take limited, noisy data that is Manchester encoded, and phase lock the local clock to it to produce a recovered clock and make a determination of the bit i.e. whether it is a "1" or a "0" represented by the noisy data in a bit cell. A bit cell is defined as a segment of time the local circuit thinks that a bit lies in. For 10 KHz data, a bit cell is 100 MSEL wide. An uncorrupted Manchester 1 and 0 has already been shown in FIG. 2. Recovered clock cycles are thought of as beginning or ending on negative transitions. Thus a clock is lined up or locked with a bit cell if the edges of the bit cell correspond to negative transitions of the clock. (As shown by the 10 KHz clock signal drawn in FIG. 3.)

It is assumed that incoming noisy data is at a rate of 10 K bits/second. As discussed above, a "1" is represented by a "0" to "1" transition in the middle of a bit cell. A "0" is represented by a "1" to "0" transition in the middle of a bit cell. By altering the algorithm slightly with regard to control of clock flipper 48, it is also possible to recover NRZ data and by altering the system clock it is possible to vary the baud rate. Incoming data is coupled to an input of edge detector 42. The edge detector puts out a single narrow pulse whenever there is a transition of the inputted data. VCO 52 comprises a 640 KHz crystal oscillator 70 providing a signal to a pulse oscillator 72. Pulse oscillator 72 is in essence a counter circuit for dividing the 640 KHz signal down to 20 KHz. VCO 52 forms a digital phase locked loop in combination with phase detector 44 and filter 46. In essence, the phase detector and filter add or delete counts in the VCO counter 72 thereby causing the 20 KHz signal to "lock" to the incoming data stream. When locked, transitions in the incoming data will line up with negative transitions on the 20 KHz recovered clock (as shown on the lower line in FIG. 3).

Phase detector 44 looks at the edges from edge detector 42 and the 20 KHz recovered signal from counter 72. It decides whether the recovered 20 KHz is early or late and by how much. Based on this determination, it generates two signals called "up/down" and "count enable" to the filter which is in essence a counter. The up/down signal is "0" if the local clock is late and "1" if the local clock is early. The count enable signal is a pulse which occurs only when there is a pulse from the edge detector and has a width proportional to the amount that the recovered clock is early or late.

The filter 46 is in essence an up/down counter which runs much faster than the baud rate. In the preferred embodiment, this counter operates at 640 KHz. The counter is enabled by the count enable from the phase detector 44. It counts up if the phase detector determines that the local clock is late and it counts down if the local clock is early. Thus the counter accumulates "earliness" or "lateness". When the counter overflows up, it causes counter circuit 72 in VCO 52 to stick a count. When the filter overflows down, it causes counter 72 to skip a count. This is analogous to deleting or adding input pulses to the VCO counter. The length of the filter counter can be varied. If the filter counter is long, more "earliness" or "lateness" must be accumulated before a correction is made. If the counter is short, only a small amount of earliness or lateness must be accumulated before a correction is made. This is analogous to a narrow and a wide bandwidth in an analog phase locked loop.

As briefly mentioned above, VCO 52 is in essence a counter 72 for dividing a local crystal generated oscillator signal down to 20 KHz. Under control of filter 46, the VCO can occasionally stick at a count which is in essence the same function as deleting pulses input to the counter, or skip a count or state which is the same as adding pulses input to the counter.

VCO 52 produces a 20 KHz square wave locked to the incoming data stream. A divide by two circuit 50 produces a 10 KHz signal locked to the input data. However, this 10 KHz signal may be 180° out of phase with the incoming data. In other words, this 10 KHz signal may be inverted. Therefore there is provided a clock flipper 48 for flipping the 10 KHz signal as necessary to correct its phase. The clock flipper, under appropriate algorithmic control, determines the correct phase and flips the 10 KHz signal if necessary. The algorithm has already been discussed.

The digital integrate and dump circuit 54 divides the bit cells into 64 parts. It includes a counter which is cleared at the beginning of a bit cell. This counter is incremented each time the incoming data looks like a 0. The counter is disabled at times when the data is likely to be going through a transition. If the limited data is "0" in more than half of the counted segments in a bit cell, then the circuit adjudges the data bit to be a "0" at the recovered data output.

Figure 6:
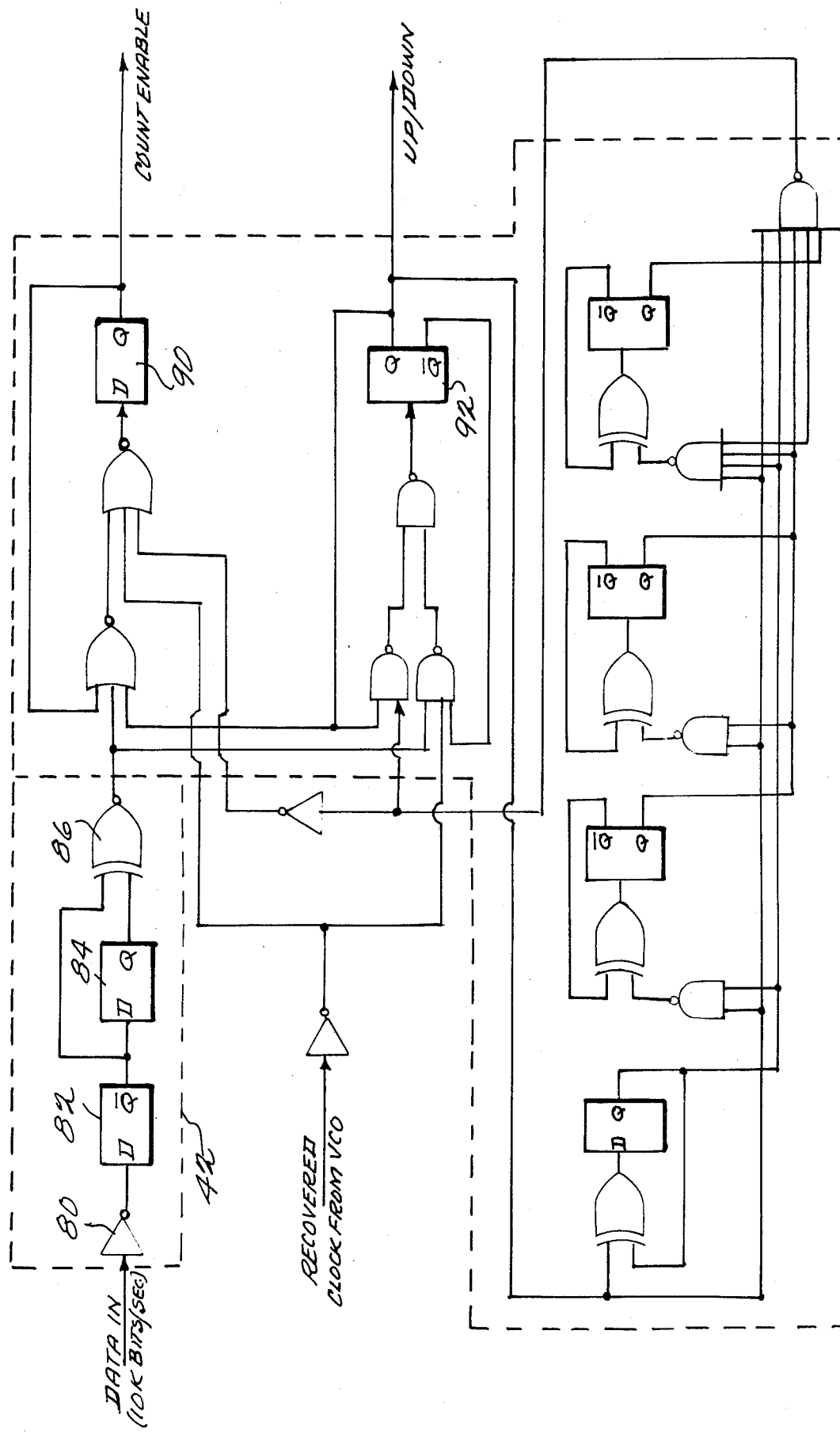
FIG. 6 is a detailed schematic diagram of edge detector 42 and phase detector 44 shown as general blocks in FIG. 5.

Referring now to FIG. 6 there is shown a detailed schematic diagram of edge detector 42 and phase detector 44. Because the diagram is so complete, little description will be provided here. Incoming data is coupled through a Schmidt trigger 80 and flip-flops 82 and 84 to a gate 86 producing an edge signal each time there is a transition in the incoming data. Functionally, a toggle flip-flop 90 provides the count enable signal to filter 46 and an up/down flip-flop 92 provides the up/down signal to filter 46.

Returning to FIG. 5, filter 46 makes a determination as to whether to add or delete a pulse in the VCO counter 72 based on the early/late information received from phase detector 44.

While the invention has been described in connection with what is presently considered to be the most practical and preferred embodiments, it is to be understood that the invention is not to be limited to the disclosed embodiments but on the contrary it is intended to cover various modifications and equivalent arrangements in-

What we claim is:

1. A clock recovery arrangement for recovering a clock signal at a first frequency, which clock signal is synchronized to a received data stream having a characteristic data bit frequency equal to said first frequency, comprising:
means for detecting edge transitions of said data stream and producing an edge signal indicative thereof;
means for generating a local second frequency clock signal, said second frequency being twice that of said first frequency, said second frequency clock signal not being phase synchronized with said received data stream;
means for phase locking said second frequency clock signal to said edge transitions to produce a phase locked second frequency clock;
means for dividing said phase locked second frequency clock by two to produce a clock signal at said first frequency that is phase locked to said edge signal and therefore phase locked to said received data stream; and
means for changing the polarity of said phase locked first frequency clock according to a predetermined function of said edge signals, thereby producing a received clock synchronized to said received data stream.

2. A clock recovery arrangement according to claim 1 wherein said phase locking means comprises a digital phase locked loop.

3. A clock recovery arrangement according to claim 1 wherein said second frequency clock generating means comprises:
an oscillator operating at a multiple of said second frequency; and
a divider, coupled to said oscillator for dividing down said oscillator frequency to said second frequency.

4. A clock recovery arrangement according to claim 3 wherein said phase locking means comprises:
a phase detector for detecting a phase difference between said edge signal and said second frequency clock signal and producing in response thereto control signals; and
an up/down counter, responsive to said control signals for counting pulses of said oscillator and in response thereto generating signals coupled to said divider for controlling addition and deletion of a pulse count thereof so as to synchronize its output with said edge signal.

5. A clock recovery arrangement according to claim 2 wherein said phase detector comprises means for generating said control signals including one such signal having a pulse width proportional to the phase difference between said edge signal and said second frequency clock.

6. A clock recovery arrangement according to claim 1 wherein said data stream is in a return-to-zero format.

7. A clock recovery arrangement according to claim 6 wherein said data stream comprises Manchester coded data.

8. A data and clock recovery system comprising:
means for receiving a data stream having a first characteristic data bit frequency;
means for detecting edge transitions of said data stream and producing an edge signal indicative thereof;
means for generating a local second frequency clock signal, said second frequency being twice that of said first frequency, said second frequency clock signal not being phase synchronized with said received data stream;
means for phase locking said second frequency clock signal to said edge transitions to produce a phase locked second frequency clock;
means for dividing said phase locked second frequency clock by two to produce a clock signal at said first frequency that is phase locked to said edge signal and therefore phase locked to said received data stream; and
means for changing the polarity of said phase locked first frequency clock according to a predetermined function of said edge signals, thereby producing a received clock synchronized to said received data stream.

9. A clock recovery arrangement according to claim 8 wherein said phase locking means comprises a digital phase locked loop.

10. A clock recovery arrangement according to claim 8 wherein said second frequency clock generating means comprises:
an oscillator operating at a multiple of said second frequency; and
a divider, coupled to said oscillator for dividing down said oscillator frequency to said second frequency.

11. A clock recovery arrangement according to claim 10 wherein said phase locking means comprises:
a phase detector for detecting a phase difference between said edge signal and said second frequency clock signal and producing in response thereto control signals; and
an up/down counter, responsive to said control signals for counting pulses of said oscillator and in response thereto generating signals coupled to said divider for controlling addition and deletion of a pulse count thereof so as to synchronize its output with said edge signal.

12. A clock recovery arrangement according to claim 9 wherein said phase detector comprises means for generating said control signals including one such signal having a pulse width proportional to the phase difference between said edge signal and said second frequency clock.

13. A clock recovery arrangement according to claim 8 wherein said data stream is in a return-to-zero format.

14. A clock recovery arrangement according to claim 13 wherein said data stream comprises Manchester coded data.

15. An arrangement for recovering a clock from Manchester coded data having a first characteristic frequency, comprising:
means for detecting edge transitions of said data stream and producing an edge signal indicative thereof;
means for generating a local second frequency clock signal, said second frequency being twice that of said first frequency, said second frequency clock signal not being phase synchronized with said recovered data stream;
means for phase locking said second frequency clock signal to said edge transitions to produce a phase locked second frequency clock;
means for dividing said phase locked second frequency clock by two to produce a clock signal at said first frequency that is phase locked to said edge signal and therefore phase locked to said received data stream; and means for changing the polarity of said phase locked first frequency clock according to a predetermined function of said edge signals, thereby producing a recovered clock synchronized to said received data stream.

16. A clock recovery arrangement according to claim 15 wherein said phase locking means comprises a digital phase locked loop.

17. A clock recovery arrangement according to claim 15 wherein said second frequency clock generating means comprises:

an oscillator operating at a multiple of said second frequency; and a divider, coupled to said oscillator for dividing down said oscillator frequency to said second frequency.

18. A clock recovery arrangement according to claim 17 wherein said phase locking means comprises:

a phase detector for detecting a phase difference between said edge signal and said second frequency clock signal and producing in response thereto control signals; and an up/down counter, responsive to said control signals for counting pulses of said oscillator and in response thereto generating signals coupled to said divider for controlling addition and deletion of a pulse count thereof so as to synchronize its output with said edge signal.

19. A clock recovery arrangement according to claim 16 wherein said phase detector comprises means for generating said control signals including one such signal having a pulse width proportional to the phase difference between said edge signal and said second frequency clock.

20. A clock recovery arrangement according to claim 15 wherein said data stream is in a return-to-zero format.

21. A clock recovery arrangement according to claim 20 wherein said data stream comprises Manchester coded data.

* * * * *